(12) United States Patent
Mentovich et al.

(10) Patent No.: US 11,496,218 B1
(45) Date of Patent: Nov. 8, 2022

(54) OPTICAL COMMUNICATION MODULES WITH IMPROVED SECURITY

(71) Applicant: Mellanox Technologies, Ltd., Yokneam (IL)

(72) Inventors: Elad Mentovich, Tel Aviv (IL); Itshak Kalifa, Bat Yam (IL); Hanan Shumacher, Kohav Yair (IL); Yoram Zer, Kibbutz Megiddo (IL); Yaakov Gridish, Yoqneam Ilit (IL); Eyal Waldman, Tel Aviv (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 17/306,210

(22) Filed: May 3, 2021

(51) Int. Cl.
*H04B 10/25* (2013.01)
*H04B 10/60* (2013.01)
*H04B 10/50* (2013.01)
*H04B 10/40* (2013.01)
*H04B 10/43* (2013.01)
*H04B 10/00* (2013.01)

(52) U.S. Cl.
CPC ........... *H04B 10/25* (2013.01); *H04B 10/501* (2013.01); *H04B 10/60* (2013.01); *H04B 10/00* (2013.01); *H04B 10/40* (2013.01); *H04B 10/43* (2013.01); *H04B 10/50* (2013.01)

(58) Field of Classification Search
None
See application file for complete search history.

(56) References Cited

U.S. PATENT DOCUMENTS

| 4,735,677 A * | 4/1988 | Kawachi | G02B 6/12004 216/24 |
| 6,769,816 B2 * | 8/2004 | Capewell | G02B 6/29367 385/24 |
| 2002/0064191 A1 * | 5/2002 | Capewell | G02B 6/29367 372/14 |
| 2002/0181046 A1 * | 12/2002 | Jeong | H04J 14/02 398/79 |
| 2006/0239463 A1 * | 10/2006 | Young | H04B 10/70 380/278 |

(Continued)

*Primary Examiner* — Darren E Wolf
(74) *Attorney, Agent, or Firm* — Moore & Van Allen PLLC

(57) ABSTRACT

Optical communication modules and associated methods and computer program products for performing network communication security are provided. An example optical module includes a substrate, a first optoelectronic component supported by the substrate configured for operation with optical signals having a first wavelength, and a second optoelectronic component supported by the substrate configured for operation with optical signals having a second wavelength. The module further includes an optical communication medium defining a first end in optical communication with the first optoelectronic component and the second optoelectronic component and a second end. The module also includes security circuitry operably connected with the first optoelectronic component and the second optoelectronic component. The security circuitry determines the presence of a noncompliant component coupled with the optical communication medium at the second end based upon operation of the second optoelectronic component.

20 Claims, 8 Drawing Sheets

(56) References Cited

U.S. PATENT DOCUMENTS

| | | | |
|---|---|---|---|
| 2008/0232804 A1* | 9/2008 | Absillis | H04J 3/14 |
| | | | 398/71 |
| 2009/0074192 A1* | 3/2009 | Beal | H04L 9/0858 |
| | | | 380/278 |
| 2010/0299526 A1* | 11/2010 | Wiseman | H04L 63/061 |
| | | | 713/171 |
| 2019/0158183 A1* | 5/2019 | Butrie | G02B 6/4204 |

* cited by examiner

OPTICAL COMMUNICATION MODULES WITH IMPROVED SECURITY

TECHNOLOGICAL FIELD

Example embodiments of the present disclosure relate generally to communication systems and, more particularly, to networking communication modules with improved security.

BACKGROUND

Datacenters and other networking environments (e.g., datacom, telecom, and/or other similar data/communication transition networks) may include connections between switch systems, servers, racks, and other devices in order to provide for signal transmission between one or more of these elements. In order to protect the data transmitted by these connections, various security protocols may be employed. Applicant has identified a number of deficiencies and problems associated with conventional networking and problems associated with network communication security. Through applied effort, ingenuity, and innovation, many of these identified problems have been solved by developing solutions that are included in embodiments of the present disclosure, many examples of which are described in detail herein.

BRIEF SUMMARY

Apparatuses, systems, methods, and computer program products are provided for improved optical communication modules and network communication security. An example optical communication module may include a substrate, a first optoelectronic component supported by the substrate configured for operation with optical signals having a first wavelength, and a second optoelectronic component supported by the substrate configured for operation with optical signals having a second wavelength. The optical communication module may further include an optical communication medium defining a first end in optical communication with the first optoelectronic component and the second optoelectronic component and a second end. The optical communication module may further include security circuitry operably connected with the first optoelectronic component and the second optoelectronic component. The security circuitry may be configured to determine the presence of a noncompliant component coupled with the optical communication medium at the second end based upon operation of the second optoelectronic component.

In some embodiments, the first optoelectronic component may include a first optical transmitter configured to generate optical signals having the first wavelength.

In other embodiments, the first optoelectronic component may include a first optical receiver configured to receive optical signals having the first wavelength.

In some embodiments, the second optoelectronic component may include a second optical transmitter configured to generate optical signals having the second wavelength. In such an embodiment, the security circuitry may be further configured to periodically cause transmission of an optical signal having the second wavelength by the second optical transmitter. In an instance in which the security circuitry fails to receive a responsive communication to the optical signal transmission by the second optical transmitter, the security circuitry may be configured to determine the presence of the noncompliant component coupled with the optical communication medium at the second end.

In other embodiments, the second optoelectronic component may include a second optical receiver configured to receive optical signals having the second wavelength. In such an embodiment, the security circuitry may be further configured to periodically detect the receipt of an optical signal having the second wavelength by the second optical receiver. In an instance in which the security circuitry fails to detect the receipt of the optical signal by the second optical receiver, the security circuitry may be configured to determine the presence of the noncompliant component coupled with the optical communication medium at the second end.

In some embodiments, the optical communication module may further include a lens assembly coupled with the first optoelectronic component and the second optoelectronic component. The lens assembly may include a filter configured to direct optical signals having the first wavelength between the first optoelectronic component and the optical communication medium The filter may further pass optical signals having the second wavelength between the second optoelectronic component and the optical communication medium.

In some further embodiments, the lens assembly may include a first reflective surface proximate the first optoelectronic component configured to reflect optical signals having the first wavelength between the first optoelectronic component and the optical communication medium. In such an embodiment, the lens assembly may also include a second reflective surface proximate the second optoelectronic component configured to reflect optical signals having the second wavelength between the second optoelectronic component and the optical communication medium.

An example method for network communication security and associated computer program product for causing an apparatus to execute the method are also provided. With reference to the example method, the method may include operating a first optoelectronic component at a first wavelength and operating a second optoelectronic component at a second wavelength, wherein the first optoelectronic component and the second optoelectronic component are in optical communication with a first end of an optical communication medium. The method may further include monitoring operation of the second optoelectronic component; and determining the presence of a noncompliant component coupled with a second end of the optical communication medium based upon operation of the second optoelectronic component.

In some embodiments, the second optoelectronic component may include a second optical transmitter configured to periodically generate optical signals having the second wavelength, and the method may further include determining the presence of the noncompliant component coupled with the optical communication medium at the second end in an instance in which a responsive communication to the periodic optical signal transmission by the second optical transmitter is not received.

In other embodiments, the second optoelectronic component may include a second optical receiver configured to receive optical signals having the second wavelength, and the method may further include determining the presence of the noncompliant component coupled with the optical communication medium at the second end in an instance in which the second optical receiver fails to receive an optical signal.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Overview

Figure 1:
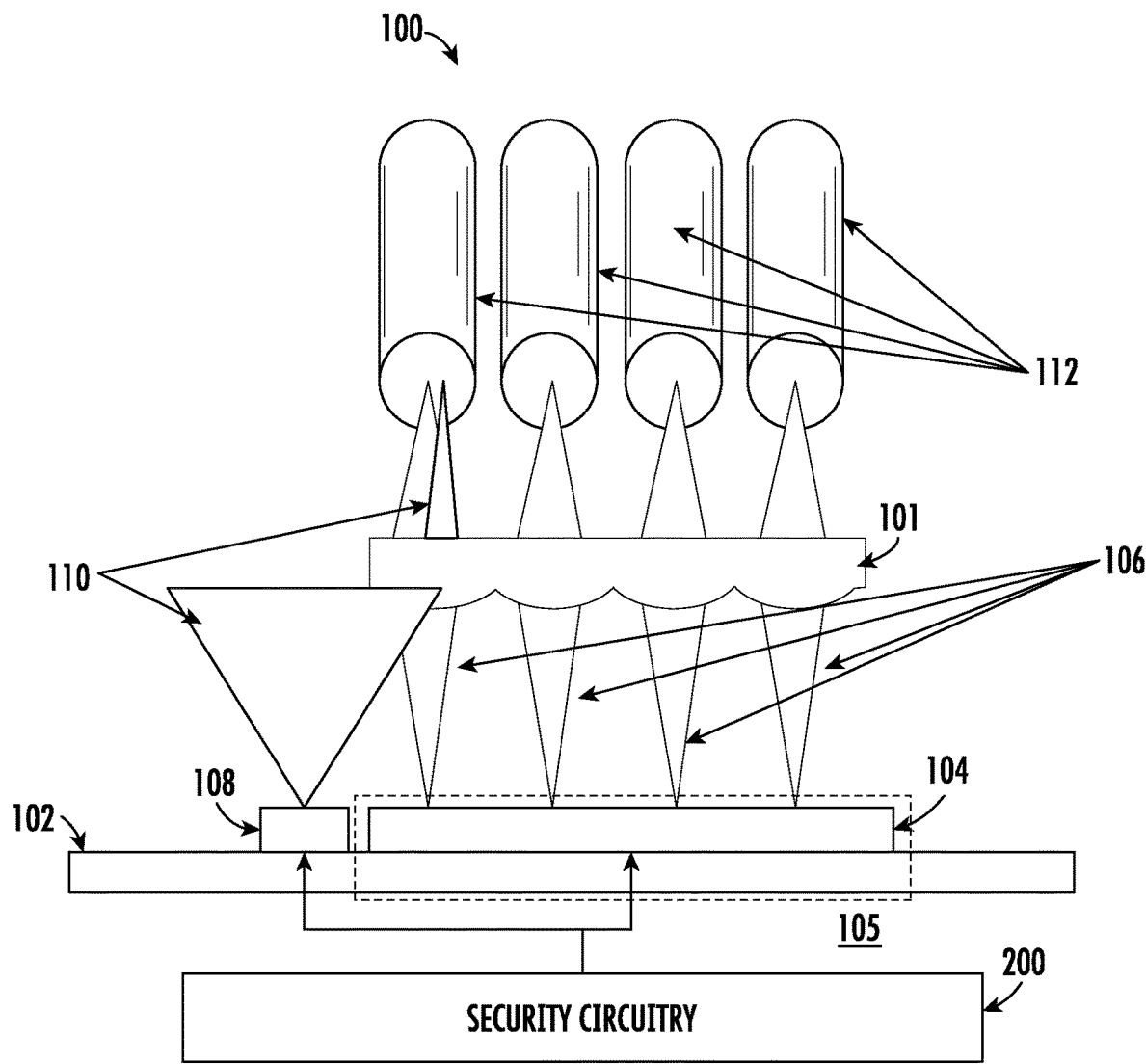
FIG. 1 illustrates an example optical communication module in accordance with some embodiments described herein.

Embodiments of the present disclosure now will be described more fully hereinafter with reference to the accompanying drawings in which some but not all embodiments are shown. Indeed, the present disclosure may be embodied in many different forms and should not be construed as limited to the embodiments set forth herein; rather, these embodiments are provided so that this disclosure will satisfy applicable legal requirements. Like numbers refer to like elements throughout. As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As noted above and described hereafter, networking systems, such as those found in datacenters, may establish inter-rack connections between racks and intra-rack connections between networking boxes, printed circuit boards (PCBs), and the like located within the same rack. These connections often rely upon transceivers, processors, chipsets, PCBs, connectors, networking cables, optical cable assemblies, copper cable assemblies, and associated communication system components to establish these connections. For example, Quad Small Form-factor Pluggable (QSFP) connectors and cables (e.g., QSFP+, QSFP28, QSFP56, QSFP112, etc.) as well as other forms of connectors such as Small Form Pluggable (SFP) connectors (e.g., as SFP+, SFP28, SFP56, SFP112, etc.) and C-Form-factor Pluggable (CFP) connectors, have long been the industry standard for providing high-speed information operations interface interconnects. More recently, Octal Small Form-factor Pluggable (OSFP) and Quad Small Form Factor Pluggable Double Density (QSFP-DD) transceivers have emerged to provide increased bit rate capabilities. Regardless of the type of optical cable connector, module, or, transceiver, the data transmitted by these devices may be subjected to various security protocols in order to properly protect this data.

Conventional attempts at securing data transmitted via networking communication systems have relied upon software-related applications alone. By way of example, data transmitted over an optical communication system that utilizes one or more transceivers, optical fibers, and the like is traditionally secured via one or more encryption protocols. As such, any attempt to access the encrypted data by an unauthorized party would further require decryption of said data. Emerging computing resources, however, have reduced the computational burden associated with decryption processes and, as such, provide a threat to security protocols that were previously thought to be secure. Furthermore, the reliance upon software-based security measures increases the complexity and latency associated with optical communication transmission. Said differently, the reliance on software-based security may operate to reduce data transmission speeds by requiring each data entry to be subjected to an encryption protocol.

In order to address these issues and others, the embodiments of the present disclosure provide optical communication modules that include two optoelectronic components (e.g., a first optical transmitter and a second optical transmitter) that each operate at different wavelengths. As described hereafter, the first optoelectronic component (e.g., a first optical transceiver, a first optical transmitter, or a first optical receiver) may be configured to transmit and/or receive data generated by the networking system components and may operate at a first wavelength. The second optoelectronic component (e.g., a second optical transceiver, a second optical transmitter, or second optical receiver) may be configured to transmit or receive optical signals at a second wavelength different from the first wavelength. The second optoelectronic component may be directly connected with security circuitry (e.g., a microcontroller, computing device, or the like) such that the optical signals transmitted or received by the second optoelectronic component may serve to determine the presence of a noncompliant component coupled with the optical communication module. Said differently, the optical signals transmitted or received by the second optoelectronic component at the second wavelength are not meant to include data entries that are usable by the system but rather are only used to confirm the presence of valid, physical system components in an optical link, such that (for example) a failure to receive optical signals having the second wavelength indicates the presence of a noncompliant component.

In this way, embodiments of the present application may improve network communication security by providing a physical component solution for detecting noncompliant networking components. In particular, the optical communication modules and associated methods of the present disclosure may reliably detect attempts to substitute or replace networking components without complex, software-based security protocols. In doing so, the embodiments described herein may maintain or improve the operational capabilities (e.g., bandwidth, transmission rate, or the like) of networking components while improving the security associated with data transmitted by these components. Furthermore, in some embodiments, the second wavelength of the second optoelectronic component may be within the visible light spectrum. In this way, the embodiments of the present disclosure may provide a visible indication of system component compatibility (e.g., a user may see the color of the optical signals transmitted or received by the second optoelectronic component).

Optical Communication Module with Optical Transmitter for Improved Security

With reference to FIG. 1, an optical communication module 100 is illustrated. As shown, the optical communication module 100 may include a substrate 102 supporting a first optoelectronic component 105 and a second optoelectronic component 108. As described herein, the first optoelectronic component 105 may include one or more first optical transmitters 104 and/or first optical receivers (e.g., a photodiode (PD) 107 in FIGS. 3 and 6) such that the first optoelectronic component 105 comprises an optical transceiver. As described hereafter with reference to FIG. 3, the first optoelectronic component 105 may be configured to generate and/or receive optical signals 106 at a first wavelength that correspond to or are otherwise associated with usable networking data entries. For example, the first optical transmitters 104 of the first optoelectronic component 105 may be configured to receive data from networking components (e.g., via a module connection 115 in FIGS. 3 and 6), convert this data into optical signals 106, and transmit these optical signals 106 via an optical communication medium 112 to another optical communication module (not shown) in optical communication with the optical communication medium 112. Additionally, the first optical receivers 107 of the first optoelectronic component 105 may be configured to receive first optical signals 106 from another optical communication module (not shown) in optical communication with the optical communication medium 112, convert these optical signals 106 into corresponding data entries, and transmit these data entries to other networking components coupled with the optical communication module 100 (e.g., via module connection 115).

To avoid overcomplicating the present disclosure, the first optoelectronic component 105 is described hereafter as including at least a first optical transmitter 104 configured to generate optical signals 106 having the first wavelength. As illustrated in FIG. 1, the first optical transmitter 104 may include a plurality of first optical transmitters 104 each configured to generate optical signals 106 having the first wavelength. The present disclosure, however, contemplates that the first optoelectronic component 105 may, in addition to the first optical transmitters 104, include first optical receivers 107 such that the first optoelectronic component 105 is an optical transceiver as described above. Alternatively, the first optoelectronic component 105 may include only a plurality of first optical receivers (e.g., PD(s) 107 in FIG. 3) configured to receive optical signals 106 having the first wavelength. Said differently, the present disclosure contemplates that the first optoelectronic component 105 may include any number of devices configured to generate and/or receive optical signals 106 having the first wavelength based upon the intended application of the optical communication module 100.

Figure 3:
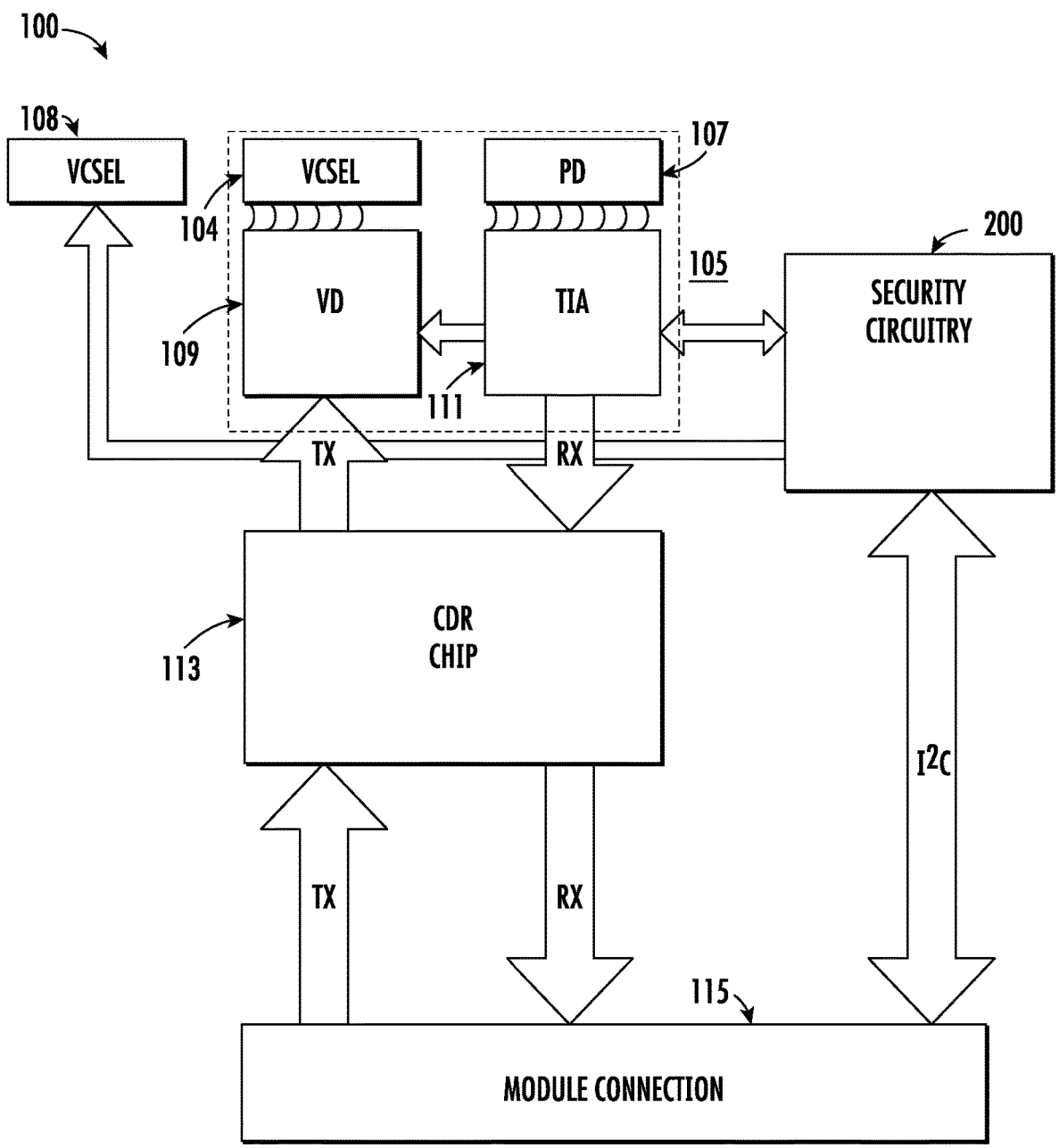
FIG. 3 is a schematic illustration of the optical communication module of FIG. 1 with associated circuitry components.
Figure 6:
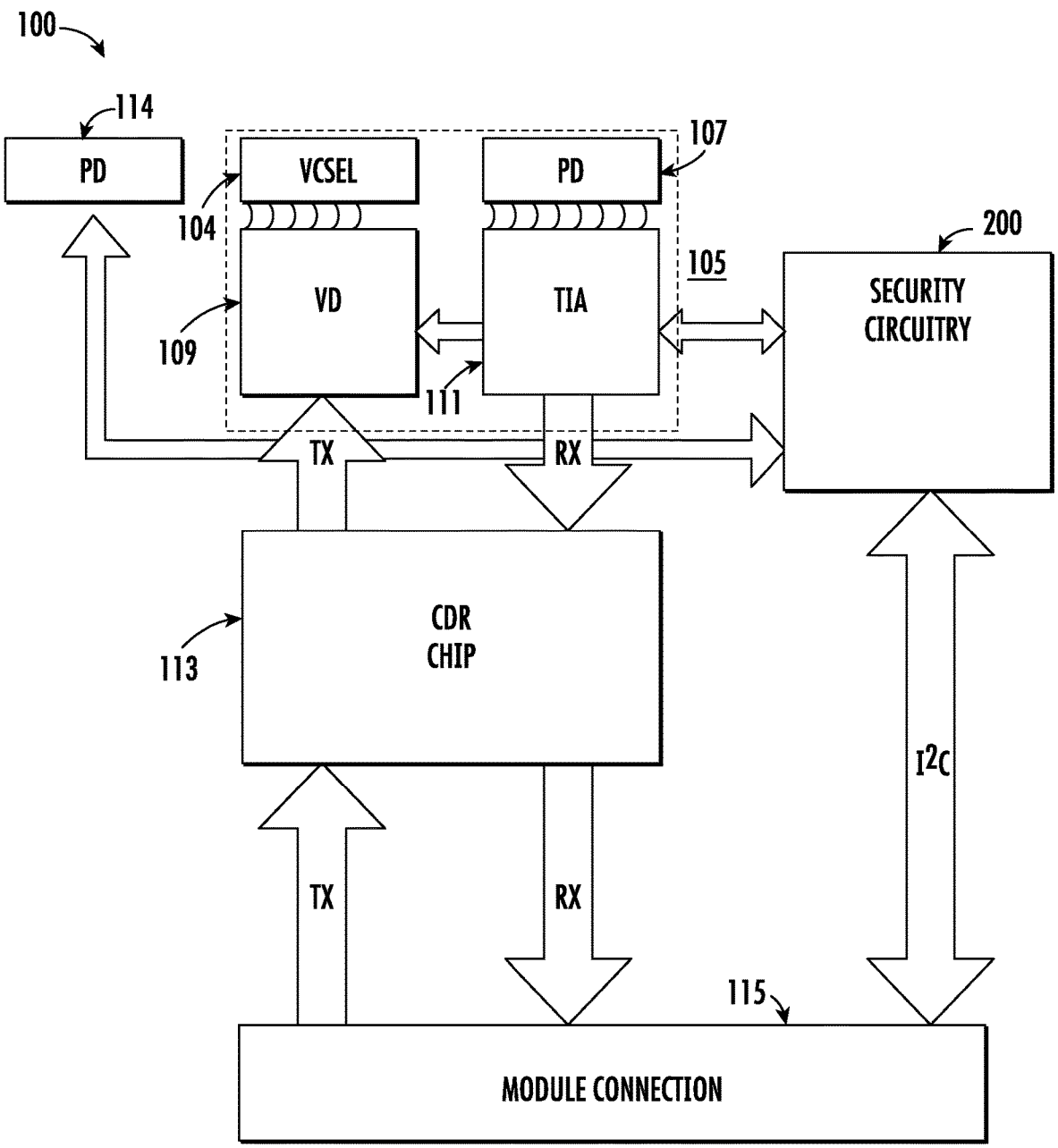
FIG. 6 is a schematic illustration of the optical communication module of FIG. 4 with associated circuitry components.

With continued reference to FIG. 1, the optical communication module 100 may include a substrate 102 that may comprise a printed circuit board (PCB) configured to provide electrical communication to various components (e.g., the first optoelectronic component 105 and the second optoelectronic component 108) supported thereon. The substrate 102 (e.g., the PCB) may, in some embodiments, comprise a dielectric material, a glass material, a polymer material, an amorphous material, or the like. Said differently, the present disclosure contemplates that the substrate 102 (e.g., the PCB) may comprise any material configured for use with optoelectronic components and/or configured to define or support electrical connection elements or features (e.g., wires, traces, etc.) to provide electrical connectivity between optoelectronic components. Furthermore, the substrate 102 may further support one or more circuitry components as shown in FIGS. 3 and 6 operably coupled with the first optoelectronic component 105 and the second optoelectronic component 108.

As described above, the first optoelectronic component 105 may include a plurality of first optical transmitters 104 configured to generate optical signals 106 having the first wavelength. By way of example, the first optical transmitters 104 may include a plurality of vertical-cavity surface-emitting lasers (VCSELs) configured to generate optical signals 106 having the first wavelength. The optical signals 106 having the first wavelength may be output by the first optical transmitters 104 and received at one or more corresponding lenses 101 that are configured to focus or otherwise direct the optical signals 106 to a corresponding optical communication medium 112 (e.g., optical fibers or cables) in communication with the first optoelectronic component 105 via a first end of the optical communication medium 112. The optical signals 106 may be transmitted via the optical communication medium 112 to other optical communication modules (not shown) in optical communication with a second end of the optical communication medium 112. The optical signals 106 received by optical communication modules (not shown) optically coupled with the optical communication medium 112 may be converted to corresponding data entries (e.g., electrical signals) for use by networking components. Said differently, the optical signals 106 generated by the first optical transmitters 104 may be usable in that these signals 106 correspond to underlying data entries. The present disclosure further contemplates that the first wavelength of the optical signals 106 may be selected based upon the intended application of the optical communication module 100.

In order to provide increased network communication security via a physical solution, the optical communication module 100 may further include a second optoelectronic component 108 that may include a second optical transmitter configured to generate optical signals 110 having a second wavelength. The present disclosure contemplates that the second optoelectronic component 108 may also include a second optical receiver (e.g., second optoelectronic component 114) as described hereafter with reference to the embodiment of FIGS. 4-6. The second optoelectronic component 108 may, as described with reference to FIGS. 1-3, generate optical signals 110 that have a second wavelength that is different from the first wavelength.

By way of example, the second optoelectronic component 108 may include a VCSEL configured to generate optical signals 110 having the second wavelength. The optical signals 110 having the second wavelength may be output by the second optoelectronic component 108 (e.g., a second optical transmitter) and received at a lens assembly 300 that is configured to also focus or otherwise direct the optical signals 110 to a corresponding optical communication medium 112 (e.g., an optical fiber or cable). As shown in FIG. 1, the optical signals 110 of the second optoelectronic component 108 may be configured to be transmitted via a common optical communication medium. Said differently, the optical signals 110 having the second wavelength may be transmitted by an optical fiber of the optical communication medium 112 that also transmits an optical signal 106 having the first wavelength. In other words, the optical communication medium 112 may be in optical communication with the second optoelectronic component 108 via the first end. The present disclosure contemplates that the second wavelength of the optical signals 110 may be selected based upon the intended application of the optical communication module 100. However, the selection of the second wavelength may account for the selected first wavelength of the optical signals 106 in order to ensure that the optical signals 110 do not interfere with transmission of the optical signals 106.

Figure 7:
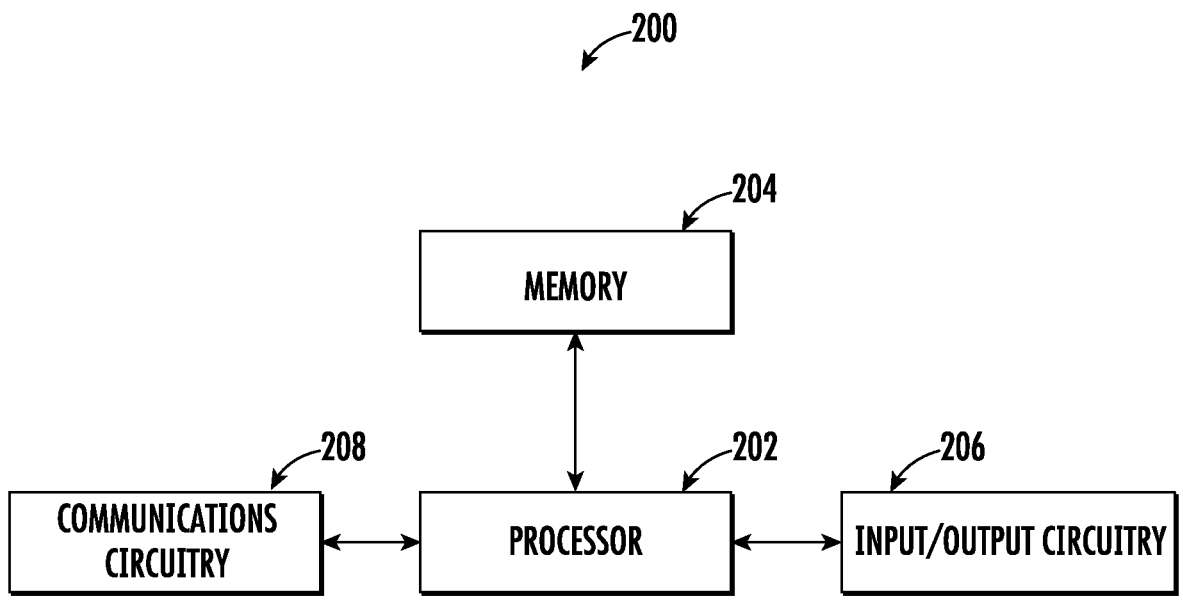
FIG. 7 illustrates a schematic block diagram of example security circuitry that may perform various operations, in accordance with some example embodiments described herein.
Figure 8:
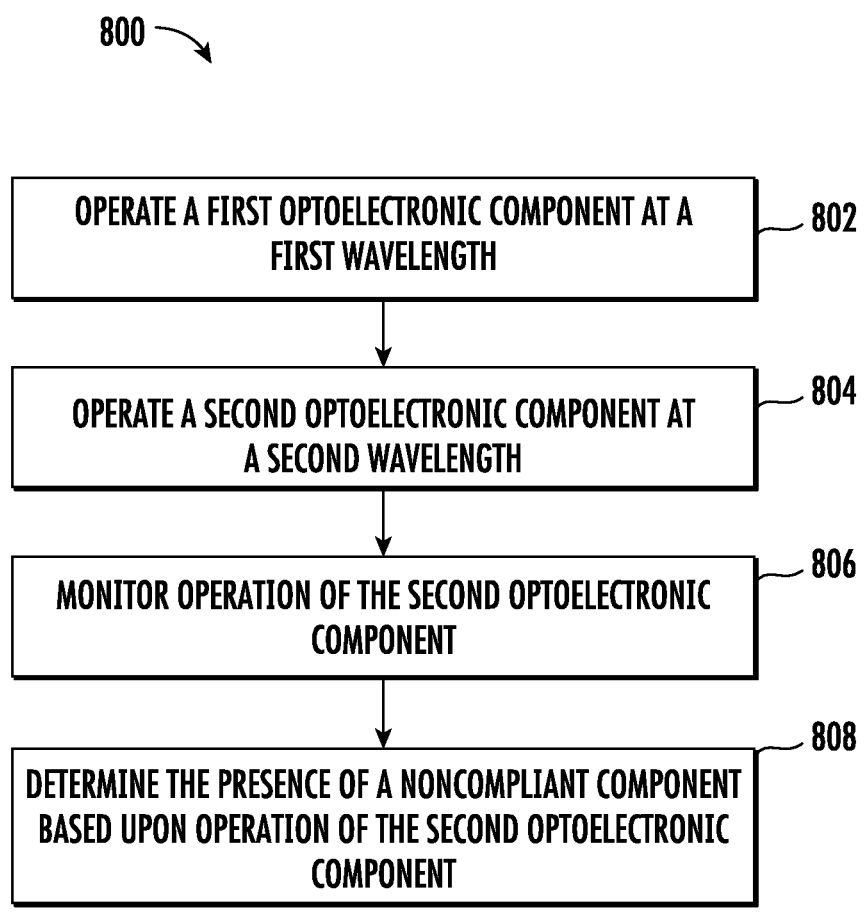
FIG. 8 is a flowchart illustrating a method for network communication security according to an example embodiment.

As described hereafter with reference to FIG. 3 and the circuitry and method of FIGS. 7-8, respectively, the optical communication module may include security circuitry 200 operably connected with the first optoelectronic component 105 and the second optoelectronic component 108. The security circuitry 200 may be configured to determine the presence of a noncompliant component (not shown) coupled with the optical communication medium 112 at the second end based upon operation of the second optoelectronic component 108. Unlike the optical signals 106 received by optical communication modules (not shown) optically coupled with the second end of the optical communication medium 112 that may be converted to corresponding data entries (e.g. electrical signals) for use by networking components, the optical signals 110 having the second wavelength are not usable (e.g., are not associated with electrical signals or data entries). Said differently, the optical signals 110 generated by the second optoelectronic component 108 are not usable in that these signals 110 do not include underlying data entries. As described hereafter, the security circuitry 200 may be configured to determine the presence of the noncompliant component coupled with the optical communication medium 112 at the second end in an instance in which the security circuitry 200 fails to receive a responsive communication to the optical signal transmission 110 by the second optoelectronic component 108 (e.g., by the second optical transmitter).

Figure 2:
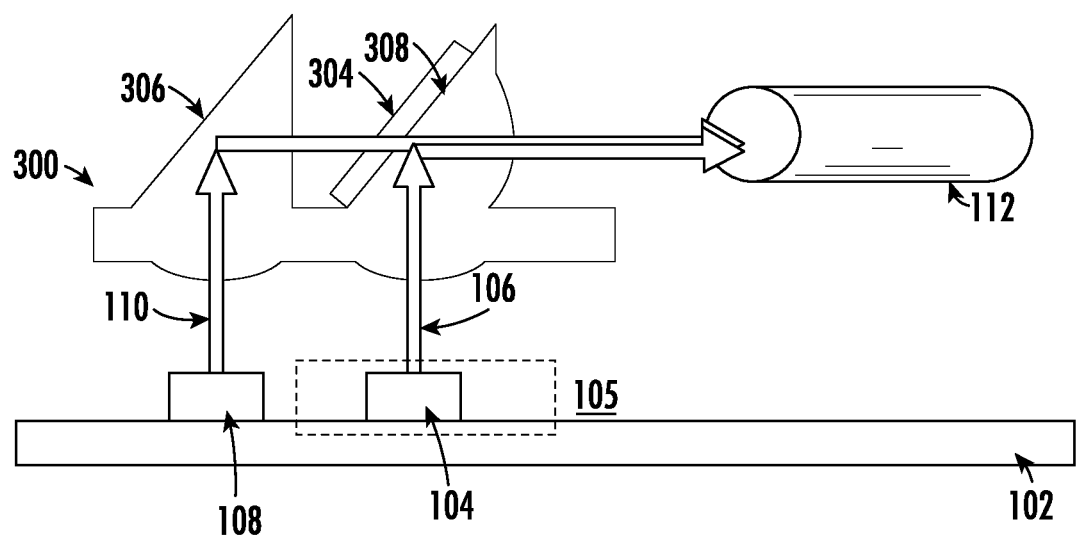
FIG. 2 illustrates an example lens assembly for use with the optical communication module of FIG. 1.

With reference to FIG. 2, an example lens assembly 300 is illustrated for use with the optical communication module 100 of FIG. 1. In order to allow optical signals having different wavelengths to be transmitted by common optical communication mediums, the optical communication module may employ a lens assembly 300 that may be coupled (e.g., supported by the substrate 102 or otherwise) with the first optoelectronic component 105 (e.g., at least one first optical transmitter 104 or receiver 107) and the second optoelectronic component 108. As shown in FIG. 2, the lens assembly 300 may include a first reflective surface 306, a second reflective surface 308, and a filter 304. The first reflective surface 306 may be positioned proximate the second optoelectronic component 108 (e.g., second optical transmitter) and in optical communication with the second optoelectronic component 108 (e.g., second optical transmitter) so as to direct optical signals 110 generated by the second optoelectronic component 108 to the optical communication medium 112. The second reflective surface 308 may be positioned proximate the first optoelectronic component 105 (e.g., the first optical transmitter 104) and in optical communication with the first optoelectronic component 105 so as to direct optical signals 106 generated by the first optoelectronic component 105 to the optical communication medium 112. In an instance in which the first optoelectronic component 105 illustrated in FIG. 2 includes a first optical receiver 107, the second reflective surface 308 may be configured to direct optical signals 106 from the optical communication medium 112 to the first optoelectronic component 105.

The lens assembly 300 may use the filter 304 to pass optical signals received from the second optoelectronic component 108 having the second wavelength into the optical communication medium 112 as shown in FIG. 2. By way of example, the second optoelectronic component 108 may generate optical signals 110 having a second wavelength, the first reflective surface 306 may reflect these optical signals 110 toward the optical communication medium 112 (e.g., into an optical path of the optical communication medium 112), and the filter 304 may allow the optical signals 110 to pass through the filter 304 and into the optical communication medium 112.

Additionally, the filter 304 may, in some embodiments, be supported by the second reflective surface 308 so as to direct optical signals 106 generated by the first optoelectronic component 105 (e.g., the first optical transmitter 104) having the first wavelength into the optical communication medium 112. By way of example, the first optical transmitter 104 may generate optical signals 106 having the first wavelength, and the filter 304 supported by the second reflective surface 308 may reflect these optical signals 106 from the first optical transmitter 104 toward the optical communication medium 112 (e.g., into an optical path of the optical communication medium 112). Said differently, the filter 304 may comprise a material configured to allow optical signals having the second wavelength to pass therethrough and to prevent optical signals having the first wavelength from passing therethrough. In an instance in which the first optoelectronic component 105 illustrated in FIG. 2 includes a first optical receiver 107, the second reflective surface 308 and filter 304 may be configured to direct optical signals 106 from the optical communication medium 112 to the first optoelectronic component 105 as described above.

The present disclosure contemplates that the first wavelength, the second wavelength, the filter 304, and the relative positioning between the second optoelectronic component 108 and the first optoelectronic component 105 may be configured (e.g., selected, sized, shaped, and/or oriented) based upon the intended application of the optical communication module 100. For example, selection of a first optical transmitter 104 configured to generate optical signals having a first wavelength that is similar (e.g., within an applicable tolerance, range, threshold, etc.) to the second wavelength generated by the second optoelectronic component 105 (e.g., the second optical transmitter) may result in interference. Said differently, in this case a filter 304 configured to prevent optical signals 106 having a first wavelength from passing therethrough may allow at least a portion of said signals to pass therethrough in an instance in which the first wavelength is approximately the same as the second wavelength (e.g., within an applicable tolerance, range, threshold, or the like). On the other hand, selection of a first optical transmitter 104 configured to generate optical signals having a first wavelength that is substantially different from the second wavelength generated by the second optoelectronic component 105 (e.g., the second optical transmitter) may require the relative positioning between the first optical transmitter 104 and the second optoelectronic component 105 (e.g., the second optical transmitter) to increase such that the dimensions of the optical communication module 100 fail to comply with applicable industry standards, regulations, or the like. As such, the present disclosure contemplates that the selection of the first wavelength and the second wavelength may be such that interference is prevented or reduced while still being able to satisfy applicable industry form factor regulations.

By way of a non-limiting example, the first optical transmitters 104 of the first optoelectronic component 105 may generate optical signals 106 having a wavelength of approximately 850 nm, and the second optoelectronic component 108 may include a second optical transmitter configured to generate optical signals 110 having a wavelength of between approximately 780 nm and approximately 940 nm. Said differently, the wavelength of the optical signals 106 and optical signals 110 may, in some embodiments, be configured to operate in parallel (e.g., be simultaneously-transmitted by the optical communication medium 112). In some embodiments, such as for short reach applications, the second optoelectronic component 108 may include a second optical transmitter configured to generate optical signals 110 having a wavelength of between approximately 450 nm and approximately 740 nm so as to provide a visible indication of system component compatibility (e.g., a user may see the color of the optical signals 110 transmitted by the second optoelectronic component 108).

In other embodiments, the first optical transmitters 104 of the first optoelectronic component 105 may generate optical signals 106 having a wavelength of approximately 910 nm, and the second optoelectronic component 108 may include a second optical transmitter configured to generate optical signals 110 having a wavelength of approximately 850 nm. In some alternative embodiments, such as lower power implementations, the first optical transmitters 104 of the first optoelectronic component 105 may generate optical signals 106 having a wavelength of approximately 850 nm, and the second optoelectronic component 108 may include a second optical transmitter configured to generate optical signals 110 having a wavelength of between approximately 780 nm and approximately 860 nm. Although described herein with reference to particular wavelengths, the present application contemplates that the wavelengths for the optical signals 106, 110 may be selected based upon the intended application of the module 100 (e.g., 910 nm-1060 nm, 1310 nm, and/or the like) and may further be selected to, in some embodiments, allow for parallel communication.

In some embodiments, the first optical transmitters 104 of the first optoelectronic component 105 may generate optical signals 106 having a wavelength that is the same as the optical signals 110 generated by the second optoelectronic component 108, such as a wavelength of approximately 850 nm. As described hereafter with reference to FIG. 8, in some embodiments, the security determinations described herein may occur as part of an initial operating procedure (e.g., a non-parallel communication example). For example, an initial hardware verification protocol may cause the second optoelectronic component 108 to generate and transmit optical signals 110 having a wavelength of approximately 850 nm for receipt by an optical receiver (not shown) in optical communication with the second optoelectronic component 108 via the optical communication medium 112. The receipt of the signal 110 may be used to verify that the optical module 100 is authentic or otherwise secure for use in the example system. Once verified, the first optical transmitters 104 may generate optical signals 106 have a wavelength of, for example, 850 nm.

Furthermore, the present disclosure contemplates that the positions of the first optical transmitter 108 and the first optical receiver 110 may be reversed. By way of example, the first optical transmitter 108 may, in some embodiments, be positioned proximate the second reflective surface 308 supporting the filter 304, and the first optical transmitter 104 may be positioned proximate the first reflective surface 306. In such an embodiment, the filter 304 may be configured to allow optical signals having the first wavelength to pass therethrough and may be configured to prevent optical signals having the second wavelength from passing therethrough. Said differently, the present disclosure contemplates that the filter 304 may be configured to prevent optical signals having a determined wavelength (or range of wavelengths) from passing therethrough or configured to allow optical signals having a determined wavelength (or range of wavelengths) to pass therethrough.

With reference to FIG. 3, a schematic illustration of the optical communication module 100 is shown with associated circuitry components. As shown, the optical communication module 100 includes the first optoelectronic component 105, the second optoelectronic component 108, and the security circuitry 200 as described above. In particular, the first optoelectronic component 108 is illustrated with a first optical transmitter 104 (e.g., a VCSEL) and a first optical receiver 107 (e.g., a PD). The optical module 100 may be connected via a module connection 115 with one or more networking components. By way of example, the optical communication module 100 may be electrically connected with a datacenter rack via the module connection 115 such that electrical signals (e.g., data entries and the like) may pass between the optical communication module 100 and the datacenter rack via the module connection 115. The optical module 100 may further include a clock and data recovery (CDR) chip 113 that may, for example, receive electrical signals and/or data and operate to synchronize this serialized data (e.g., without a clock signal). The present disclosure contemplates that the CDR chip 113 may include any computing device or circuitry component configured to facilitate the extraction of timing information associated with a serial data stream to assist in the coding or decoding of transmitted serialized data. The optical communication module 100 may further include optical transimpedance amplifiers (TIA) 111 and/or voltage drops (VD) 109 configured to facilitate transmission of the optical signals 106 having the first wavelength. As shown in FIG. 3, the second optoelectronic component 108 (e.g., a second optical transmitter or VCSEL) may be directly connected with the security circuitry 200 as described hereafter with reference to FIG. 8.

Optical Communication Module with Optical Receiver for Improved Security

Figure 4:
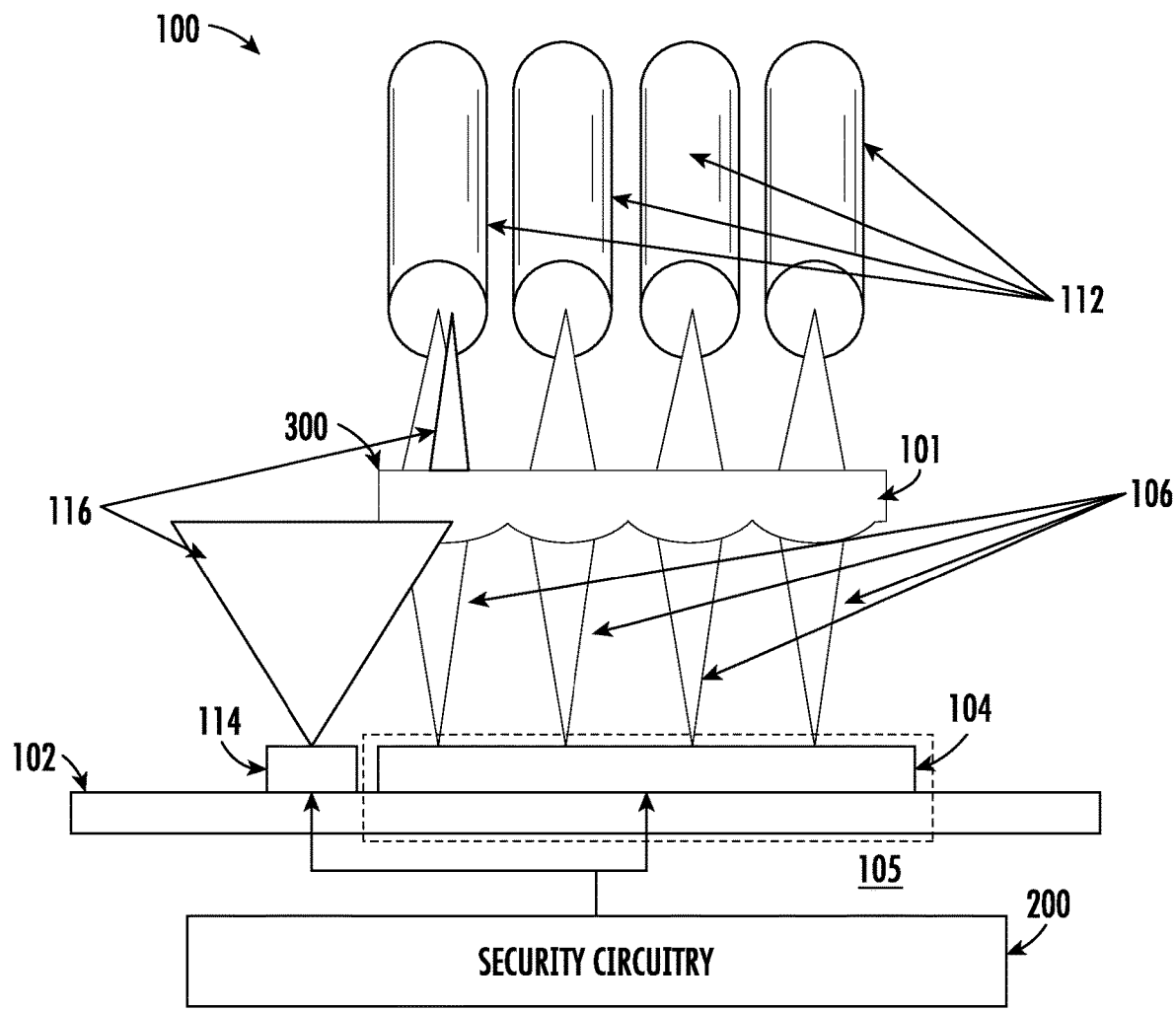
FIG. 4 illustrates an example optical communication module in accordance with some embodiments described herein.

With reference to FIG. 4, an optical communication module 100 is illustrated. As shown, the optical communication module 100 may include a substrate 102 supporting a first optoelectronic component 105 and a second optoelectronic component 114. As described above, the first optoelectronic component 105 may include one or more first optical transmitters 104 or first optical receivers (e.g., photodiode (PD) 107 in FIG. 6) such that the first optoelectronic component 105 comprises an optical transceiver. The first optoelectronic component 105 may be configured to generate and/or receive optical signals 106 at a first wavelength that correspond to or are otherwise associated with usable networking data entries. As described above with reference to FIG. 1, the first optoelectronic component 105 may include a plurality of first optical transmitters 104 and/or a plurality of optical receivers configured to generate and/or receive optical signals 106 having the first wavelength based upon the intended application of the optical communication module 100. The components of the optical communication module 100 of FIGS. 4-6 may similarly be supported by the substrate 102 (e.g., a printed circuit board (PCB)) configured to provide electrical communication to various components.

As indicated above, in some embodiments, the second optoelectronic component 114 may be a second optical receiver that receives optical signals 116 that have a second wavelength that is different from the first wavelength. By way of example, the second optoelectronic component 114 may include a photodiode (PD) configured to receive optical signals 116 having the second wavelength. The optical signals 116 may similarly be transmitted by a corresponding optical communication medium 112 (e.g., an optical fiber or cable), received by the lens assembly 300, and directed to the second optoelectronic component 114. Similar to the embodiment of FIG. 1, the optical signals 116 of the second optoelectronic component 114 may also be configured to be transmitted via a common optical communication medium. Said differently, the optical signals 116 having the second wavelength may be transmitted by an optical fiber of the optical communication medium 112 that also transmits the optical signal 106 having the first wavelength. In other words, the optical communication medium 112 may also be in optical communication with the second optoelectronic component 114 via the first end. The present disclosure contemplates that the second wavelength of the optical signals 116 may be selected based upon the intended application of the optical communication module 100. As above, the selection of the second wavelength may account for the selected first wavelength of the optical signals 106 in order to ensure that the optical signal 116 does not interfere with the transmission of the optical signal 106.

As described hereafter with reference to FIG. 6 and the circuitry and method of FIGS. 7-8, respectively, the optical communication module 100 may include security circuitry 200 operably connected with the first optoelectronic component 105 and the second optoelectronic component 114. The security circuitry 200 may be configured to determine the presence of a noncompliant component (not shown) coupled with the optical communication medium 112 at the second end based upon operation of the second optoelectronic component 114. Unlike the optical signals 106 received by optical communication modules (not shown) optically coupled with the second end of the optical communication medium 112 that may be converted to corresponding data entries (e.g., electrical signals) for use by networking components, the optical signals 116 having the second wavelength are not usable (e.g., they are not convertible to electrical signals or data entries). Said differently, the optical signals 116 received by the second optoelectronic component 114 are not usable in that these signals 116 do not include underlying data entries. As described hereafter, the security circuitry 200 may be configured to determine the presence of the noncompliant component coupled with the optical communication medium 112 at the second end in an instance in which the security circuitry 200 fails to detect the receipt of the optical signal by the second optical receiver (e.g., by the second optoelectronic component 114).

Figure 5:
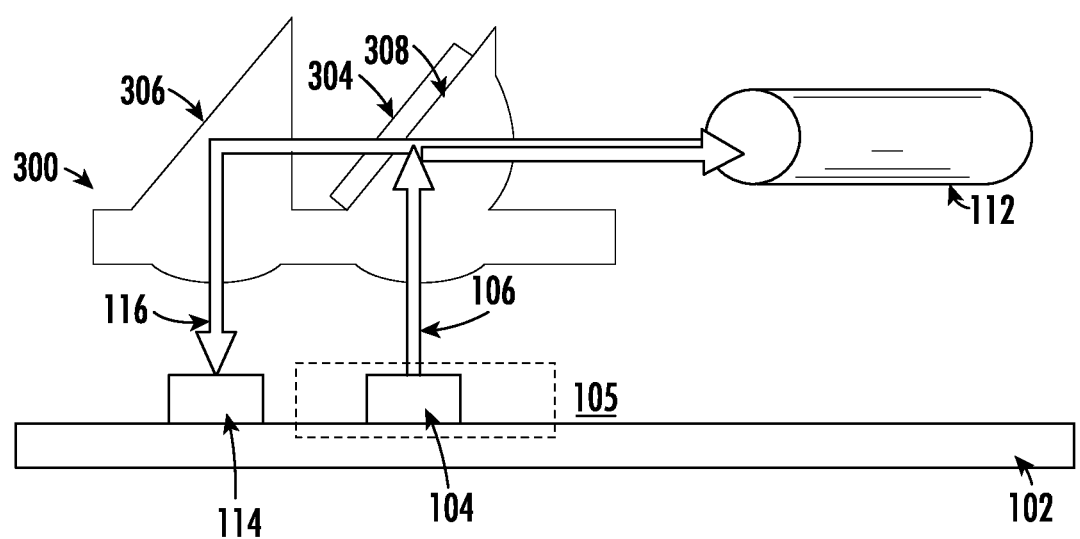
FIG. 5 illustrates an example lens assembly for use with the optical communication module of FIG. 4.

With reference to FIG. 5, an example lens assembly 300 is illustrated for use with the optical communication module of FIG. 4. In order to allow optical signals having different wavelengths to be transmitted by common optical communication mediums, the optical communication module 100 may employ a lens assembly 300 that may be coupled (e.g., supported by the substrate 102 or otherwise) with the first optoelectronic component 105 (e.g., at least one first optical transmitter 104 or receiver 107) and the second optoelectronic component 114. Similar to the operation of FIG. 2, the lens assembly 300 may include a first reflective surface 306, a second reflective surface 308, and a filter 304. The first reflective surface 306 may be positioned proximate the second optoelectronic component 114 (e.g., the second optical receiver) and may be in optical communication with the second optoelectronic component 114 (e.g., the second optical receiver) so as to direct optical signals 116 from the optical communication medium 112 having the second wavelength to the second optoelectronic component 114. The second reflective surface 308 may be positioned proximate the first optoelectronic component 105 (e.g., the first optical transmitter 104) and may be in optical communication with the first optoelectronic component 105 so as to direct optical signals 106 generated by the first optoelectronic component 105 to the optical communication medium 112.

The lens assembly 300 may use the filter 304 to pass optical signals received from the optical communication medium 112 having the second wavelength to the second optoelectronic component 114 as shown in FIG. 5. By way of example, an optical module (not shown) in optical communication with the optical communication medium 112 may generate an optical signal having the second wavelength similar to the second optoelectronic component 108 of FIG. 1. The second reflective surface 308 and filter 304 may pass the optical signals 116 from the optical communication medium 112 through the filter and to the first reflective surface 306. The first reflective surface 306 may reflect the optical signals 116 having the second wavelength to the second optoelectronic component 114 (e.g., the second optical receiver). As described above with reference to FIG. 2, the present disclosure contemplates that the first wavelength, the second wavelength, the filter 304, and the relative positioning between the second optoelectronic component 114 and the first optoelectronic component 105 may be configured based upon the intended application of the optical communication module 100. Said differently, the second optoelectronic component 114 may be configured for use with, for example, the wavelengths provided above with reference to FIGS. 1-3.

With reference to FIG. 6, a schematic illustration of the optical communication module 100 is illustrated with associated circuitry components. The optical communication module may include the same circuitry components as illustrated in FIG. 3; however, the second optoelectronic component 114 is illustrated as configured to transmit data to the security circuitry 200. In the embodiment of FIG. 3, the second optoelectronic device 108 operates as an optical transmitter such that the security circuitry 200 as described hereafter may periodically cause transmission of the optical signal 110 having the second wavelength by the second optical transmitter (e.g., the second optoelectronic component 108). In the embodiment of FIG. 6, however, the security circuitry 200 may be configured to periodically detect receipt of the optical signal 116 having the second wavelength by the second optical receiver (e.g., the second optoelectronic component 114). As described hereafter, the security circuitry 200 may periodically transmit an interrogatory signal or otherwise query the second optoelectronic component 114 to determine if the optical signal 116 having the second wavelength has been received.

Security Circuitry

The security circuitry 200 may include circuitry, networked processors, or the like configured to perform some or all of the apparatus-based (e.g., security circuitry-based) processes described herein and may be any suitable controller, microcontroller, computing device, network server, and/or other type of processing device. In this regard, the security circuitry 200 may be embodied by any of a variety of devices. For example, the security circuitry 200 may be configured to receive/transmit data and may include any of a variety of fixed terminals, such as a server, microcontroller, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals. Example embodiments contemplated herein may have various form factors and designs but will nevertheless include at least the components illustrated in FIG. 7 and described in connection therewith. In some embodiments as shown in FIGS. 1-6, the security circuitry 200 may be embodied as a microcontroller supported by the substrate 102 such that performance of the operations of FIG. 8 occur locally on the optical communication module 100. In other embodiments, the security circuitry 200 may be located remotely from the optical communication module 100. In such an embodiment, the security circuitry 200 may be, for example, located as part of a network security sever or other remote computing device operably coupled with the optical communication module 100 and/or a plurality of other optical communication modules distributed within the networking system. Despite the many arrangements contemplated herein, the security circuitry 200 is shown and described herein as a single computing device for ease of explanation and to avoid unnecessarily overcomplicating the disclosure.

As illustrated in FIG. 7, the security circuitry 200 may include a processor 202, a memory 204, communications circuitry 208, and input/output circuitry 206. The security circuitry 200 may be configured to execute the operations described below in connection with FIG. 8. Although components 202-208 are described in some cases using functional language, it should be understood that the particular implementations necessarily include the use of particular hardware. It should also be understood that certain of these components 202-208 may include similar or common hardware. For example, two sets of circuitry may both leverage use of the same processor 202, memory 204, communications circuitry 208, or the like to perform their associated functions, such that duplicate hardware is not required for each set of circuitry. The use of the term "circuitry" as used herein includes particular hardware configured to perform the functions associated with respective circuitry described herein. As described in the example above, in some embodiments, various elements or components of the circuitry of the security circuitry 200 may be housed within the optical communication module 100. It will be understood in this regard that some of the components described in connection with the security circuitry 200 may be housed within one of these devices, while other components may be housed within another of these devices, or by yet another device not expressly illustrated in FIGS. 1-6.

Of course, while the term "circuitry" should be understood broadly to include hardware, in some embodiments, the term "circuitry" may also include software for configuring the hardware. For example, although "circuitry" may include processing circuitry, storage media, network interfaces, input/output devices, and the like, other elements of the security circuitry 200 may provide or supplement the functionality of particular circuitry.

In some embodiments, the processor 202 (and/or co-processor or any other processing circuitry assisting or otherwise associated with the processor) may be in communication with the memory 204 via a bus for passing information among components of the security circuitry 200. The memory 204 may be non-transitory and may include, for example, one or more volatile and/or non-volatile memories. For example, the memory may be an electronic storage device (e.g., a non-transitory computer readable storage medium). The memory 204 may be configured to store information, data, content, applications, instructions, or the like, for enabling the security circuitry 200 to carry out various functions in accordance with example embodiments of the present disclosure.

The processor 202 may be embodied in a number of different ways and may, for example, include one or more processing devices configured to perform independently. Additionally, or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the security circuitry, and/or remote or "cloud" processors.

In an example embodiment, the processor 202 may be configured to execute instructions stored in the memory 204 or otherwise accessible to the processor 202. Alternatively, or additionally, the processor 202 may be configured to execute hard-coded functionality. As such, whether configured by hardware or by a combination of hardware with software, the processor 202 may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure the processor 202 to perform the algorithms and/or operations described herein when the instructions are executed.

The security circuitry 200 may further include input/output circuitry 206 that may, in turn, be in communication with the processor 202 to provide output to a user and to receive input from a user, user device, or another source. In this regard, the input/output circuitry 206 may comprise a display that may be manipulated by an application. In some embodiments, the input/output circuitry 206 may also include additional functionality such as a keyboard, a mouse, a joystick, a touch screen, touch areas, soft keys, a microphone, a speaker, or other input/output mechanisms. The security circuitry 200 comprising the processor 202 may be configured to control one or more functions of a display through computer program instructions (e.g., software and/ or firmware) stored on a memory accessible to the processor (e.g., the memory 204 and/or the like).

The communications circuitry 208 may be any means such as a device or circuitry embodied in either hardware or a combination of hardware and software that is configured to receive and/or transmit data from/to a network and/or any other device, circuitry, or module in communication with the security circuitry 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s). These signals may be transmitted by the security circuitry 200 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols.

As used herein, the term "computer-readable medium" refers to non-transitory storage hardware, non-transitory storage device or non-transitory computer system memory that may be accessed by a controller, a microcontroller, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Exemplary non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM), and the like.

Example Methods of Network Communication Security

Turning next to FIG. 8, a flowchart is shown for network communication security 800. The operations illustrated in FIG. 8 may, for example, be performed by, with the assistance of, and/or under the control of an apparatus (e.g., security circuitry 200), as described above. In this regard, performance of the operations may invoke one or more of processor 202, memory 204, input/output circuitry 206, communications circuitry 208, and/or input analysis circuitry 210.

As shown in operation 802, the apparatus (e.g., security circuitry 200) includes means, such as processor 202 or the like, for operating a first optoelectronic component 105 at a first wavelength. As described above, the first optoelectronic component 105 may include a plurality of first optical transmitters 104 configured to generate optical signals 106 having the first wavelength. By way of example, the first optical transmitters 104 may include a plurality of VCSELs configured to generate optical signals 106 having the first wavelength. The optical signals 106 having the first wavelength may be output by the first optical transmitters 104 and transmitted via the optical communication medium 112 to other optical communication modules (not shown) in optical communication with a second end of the optical communication medium 112. The optical signals 106 received by optical communication modules (not shown) optically coupled with the optical communication medium 112 may be converted to corresponding data entries (e.g. electrical signals) for use by networking components.

As shown in operation 804, the apparatus (e.g., security circuitry 200) includes means, such as the processor 202, input/output circuitry 206, or the like, for operating a second optoelectronic component 108, 114 at a second wavelength. As described above with reference to FIGS. 1-3, the second optoelectronic component 108 may include a VCSEL configured to generate optical signals 110 having the second wavelength. The optical signals 110 having the second wavelength may be output by the optoelectronic component 110 (e.g., a second optical transmitter) and received by a corresponding optical communication medium 112 (e.g., an optical fiber or cable). In such an embodiment, the security circuitry 200 may be configured to periodically cause transmission of the optical signal 110 having the second wavelength by the second optical transmitter (e.g., the second optoelectronic component 108). By way of example, the security circuitry 200 may be configured, based upon an initial set up procedure, in accordance with applicable industry regulations or the like, to periodically send instructions to the second optoelectronic component 108 to generate and transmit the optical signals 110 having the second wavelength. In some embodiments, the security circuitry 200 may cause transmission of the optical signal 110 in response to a user input received via input/output circuitry 216. By way of example, an operator associated with a networking communication system may periodically perform a security check or protocol in order to determine the presence of any noncompliant components within the networking communication system. As part of such a security check or protocol, the operator may input instructions to the security circuitry 200 to cause transmission of the optical signals 110.

With continued reference to operation 804 and as described above with reference to FIGS. 4-6, the second optoelectronic component 114 may include a PD configured to receive optical signals 116 having the second wavelength. The optical signals 116 having the second wavelength may be output by an second optical transmitter of an optical communication module (not shown) in optical communication with the second end of the optical communication medium 112. In such an embodiment, the security circuitry 200 may be configured to periodically detect the receipt of an optical signal 116 having the second wavelength by the second optical receiver (e.g., the second optoelectronic component 114). By way of example, the security circuitry 200 may be configured, based upon an initial set up procedure, in accordance with applicable industry regulations, or the like, to periodically query the second optoelectronic component 114 to determine if optical signals having the second wavelength (e.g. optical signals 116) have been received. In some embodiments, the second optoelectronic component 114 (e.g., the second optical receiver) may periodically transmit a signal associated with receipt or lack of receipt to the security circuitry and/or may transmit a signal indicative of receipt responsive to receipt of the optical signal 116.

Thereafter, as shown in operations 806 and 808, the apparatus (e.g., security circuitry 200) includes means, such as the processor 202, communications circuitry 208, or the like, for monitoring operation of the second optoelectronic component and determining the presence of a noncompliant component based upon operation of the second optoelectronic component, respectively. As described above, the embodiments of the present disclosure provide improved networking security by providing a physical component solution for detecting noncompliant networking components. By way of example, unauthorized users may attempt to replace or substitute a valid optoelectronic module of a networking communication system with another optical module in order to access data passing through such an optical module. In order to detect the presence of such a noncompliant component, the security circuitry 200 may rely upon the operation of the second optoelectronic component 108, 114. The optical communication modules 100 described herein may transmit optical signals 110, 116 of a second wavelength that are not usable (e.g., not associated or indicative of valid electrical signals or data) such that a noncompliant component (e.g., an unauthorized optical module) fails to transmit or detect these optical signals 110, 116.

In an instance in which the second optoelectronic component 108 is a second optical transmitter, the security circuitry 200 may cause periodic transmission of optical signals 110 having the second wavelength and await a responsive communication to said optical signals 110. By way of example, the security circuitry 200 may be operably connected with a plurality of optical modules (not shown) in optical communication with the optical communication medium 112. As such, the security circuitry 200 may, in response to transmission of the optical signals 110, query one or more of the optical communication modules (not shown) to determine if a corresponding second optoelectronic component (e.g., a second optical receiver) is present to receive the optical signals 110 at the second wavelength. In an instance in which the security circuitry 200 fails to receive a responsive communication to the optical signal 116 transmission by the second optical transmitter (e.g., the second optoelectronic component 108), the security circuitry 200 may determine the presence of a noncompliant component in optical communication with the second end of the optical communication medium 112.

In an instance in which the second optoelectronic component 114 is a second optical receiver, the security circuitry 200 may periodically detect for the receipt of optical signals 116 having the second wavelength. By way of example, a networking communication system may, as part of a security protocol or otherwise, require that optical signals having the second wavelength 116 be transmitted by optical modules (not shown) connected within the system. As such, the receipt of such an optical signal 116 should occur as dictated by the security protocol. Therefore, in an instance in which the security circuitry 200 fails to detect the receipt of the optical signal 116 by the second optical receiver (e.g., the second optoelectronic component 108), the security circuitry 200 may determine the presence of a noncompliant component in optical communication with the second end of the optical communication medium 112.

Many modifications and other embodiments of the inventions set forth herein will come to mind to one skilled in the art to which these inventions pertain having the benefit of the teachings presented in the foregoing descriptions and the associated drawings. Although the figures only show certain components of the methods and systems described herein, it is understood that various other components may also be part of any optical component or optoelectronic element. In addition, the method described above may include fewer steps in some cases, while in other cases may include additional steps. Modifications to the steps of the method described above, in some cases, may be performed in any order and in any combination.

As described above, in some embodiments, the operations of method 800 may occur as part of an initial operating procedure. For example, an initial hardware verification protocol may cause the operations 804-808 to occur prior to operation 802. Said differently, the security circuitry may cause the second optoelectronic component to transmit or receive optical signals having the second wavelength as described with reference to operation 804 in order to verify the authenticity and security of the associated optical module. The monitoring of the operation of the second optoelectronic component as described with reference to operation 804 may occur to determine the presence of a noncompliant component based upon operation of the second optoelectronic component as described with reference to operation 808. In an instance in which a compliant component is determined, operation 802 may commence. Said differently, the receipt of the signals generated by or transmitted to the second optoelectronic component may be used to verify that the optical module is authentic or otherwise secure for use in the example system prior to signal transmission by the first optoelectronic component (e.g., an initial hardware verification protocol).

Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An optical communication module comprising:
   a substrate;
   a first optoelectronic component supported by the substrate configured to generate and receive optical signals having a first wavelength;
   a second optoelectronic component supported by the substrate configured to generate and receive optical signals having a second wavelength;
   an optical communication medium defining a first end in optical communication with the first optoelectronic component and the second optoelectronic component and a second end; and
   security circuitry operably connected with the first optoelectronic component and the second optoelectronic component, wherein the security circuitry is configured to determine the presence of a noncompliant component coupled with the optical communication medium at the second end in an instance in which the security circuitry fails to receive a responsive communication to an optical signal transmitted by the second optoelectronic component.

2. The optical communication module according to claim 1, wherein the first optoelectronic component comprises a first optical transceiver configured to generate optical signals having the first wavelength and receive optical signals having the first wavelength.

3. The optical communication module according to claim 1, wherein the second optoelectronic component comprises a second optical transceiver configured to generate optical signals having the second wavelength and receive optical signals having the second wavelength.

4. The optical communication module according to claim 3, wherein the security circuitry is further configured to periodically cause transmission of an optical signal having the second wavelength by the second optical transceiver.

5. The optical communication module according to claim 4, wherein the security circuitry is configured to determine the presence of the noncompliant component coupled with the optical communication medium at the second end in an instance in which the security circuitry fails to receive a responsive optical signal to the optical signal transmitted by the second optical transceiver having the second wavelength.

6. The optical communication module according to claim 1, wherein the security circuitry is further configured to periodically detect the receipt of an optical signal having the second wavelength by the second optoelectronic component.

7. The optical communication module according to claim 1, further comprising a lens assembly coupled with the first optoelectronic component and the second optoelectronic component, wherein the lens assembly comprises a filter configured to:
  direct optical signals having the first wavelength between the first optoelectronic component and the optical communication medium; and
  pass optical signals having the second wavelength between the second optoelectronic component and the optical communication medium.

8. The optical communication module according to claim 7, wherein the lens assembly further comprises:
  a first reflective surface configured to reflect optical signals having the first wavelength between the first optoelectronic component and the optical communication medium; and
  a second reflective surface configured to reflect optical signals having the second wavelength between the second optoelectronic component and the optical communication medium.

9. A method for network communication security, the method comprising:
  operating a first optoelectronic component at a first wavelength, wherein the first optoelectronic component is configured to generate and receive optical signals having the first wavelength;
  operating a second optoelectronic component at a second wavelength, wherein the second optoelectronic component is configured to generate and receive optical signals having the second wavelength, wherein the first optoelectronic component and the second optoelectronic component are in optical communication with a first end of an optical communication medium;
  monitoring operation of the second optoelectronic component; and
  determining the presence of a noncompliant component coupled with a second end of the optical communication medium in an instance in which the second optoelectronic component fails to receive a responsive communication to an optical signal transmitted by the second optoelectronic component.

10. The method according to claim 9, wherein the first optoelectronic component comprises a first optical transceiver configured to generate optical signals having the first wavelength and receive optical signals having the first wavelength.

11. The method according to claim 9, wherein the second optoelectronic component comprises a second optical transceiver configured to periodically generate optical signals having the second wavelength, and wherein the method further comprises determining the presence of the noncompliant component coupled with the optical communication medium at the second end in an instance in which a responsive optical signal to the periodic optical signal transmission by the second optical transceiver having the second wavelength is not received.

12. A non-transitory computer-readable storage medium for using an apparatus for network communication security, the non-transitory computer-readable storage medium storing instructions that, when executed, cause the apparatus to:
  operate a first optoelectronic component at a first wavelength, wherein the first optoelectronic component is configured to generate and receive optical signals having the first wavelength;
  operate a second optoelectronic component at a second wavelength, wherein the second optoelectronic component is configured to generate and receive optical signals having the second wavelength, wherein the first optoelectronic component and the second optoelectronic component are in optical communication with a first end of an optical communication medium;
  monitor operation of the second optoelectronic component; and
  determine the presence of a noncompliant component coupled with a second end of the optical communication medium in an instance in which the second optoelectronic component fails to receive a responsive communication to an optical signal transmitted by the second optoelectronic component.

13. The non-transitory computer-readable storage medium according to claim 12, wherein the non-transitory computer-readable storage medium further comprises instructions that, when executed, cause the apparatus to periodically cause transmission of an optical signal having the second wavelength by the second optoelectronic component.

14. The non-transitory computer-readable storage medium according to claim 13, wherein the non-transitory computer-readable storage medium further comprises instructions that, when executed, cause the apparatus to determine the presence of the noncompliant component coupled with the optical communication medium at the second end in an instance in which the apparatus fails to receive a responsive optical signal to the optical signal transmission by the second optoelectronic component having the second wavelength.

15. The non-transitory computer-readable storage medium according to claim 12, wherein the non-transitory computer-readable storage medium further comprises instructions that, when executed, cause the apparatus to:
  periodically detect the receipt of an optical signal having the second wavelength by the second optoelectronic component; and
  determine the presence of the noncompliant component coupled with a second end of the optical communication medium in an instance in which the apparatus fails to detect the receipt of the optical signal by the optoelectronic component.

16. The optical communication module according to claim 1, wherein the first optical signals correspond to usable networking data entries.

17. The optical communication module according to claim 1, wherein the second optical signals do not correspond to usable networking data entries.

18. The optical communication module according to claim 1, wherein the security circuitry is further configured to determine the presence of the noncompliant component coupled with the optical communication medium at the second end in an instance in which the security circuitry fails to receive a responsive optical signal to the optical signal transmitted by the second optoelectronic component having the second wavelength while the first optoelectronic component receives a responsive communication to the optical signal transmitted by the first optoelectronic component.

19. The optical communication module according to claim 1, wherein the security circuitry is configured to cause the second optoelectronic component to periodically transmit optical signals at the second wavelength.

20. The optical communication module according to claim 1, wherein the security circuitry is configured to cause the second optoelectronic component to transmit optical signals at the second wavelength as part of an initial operating procedure in which the optical communication module is initially connected with the optical communication medium.

* * * * *